T. H. THOMAS.
BRAKE PIPE VENT VALVE.
APPLICATION FILED AUG. 21, 1920.
1,384,930.
Patented July 19, 1921.
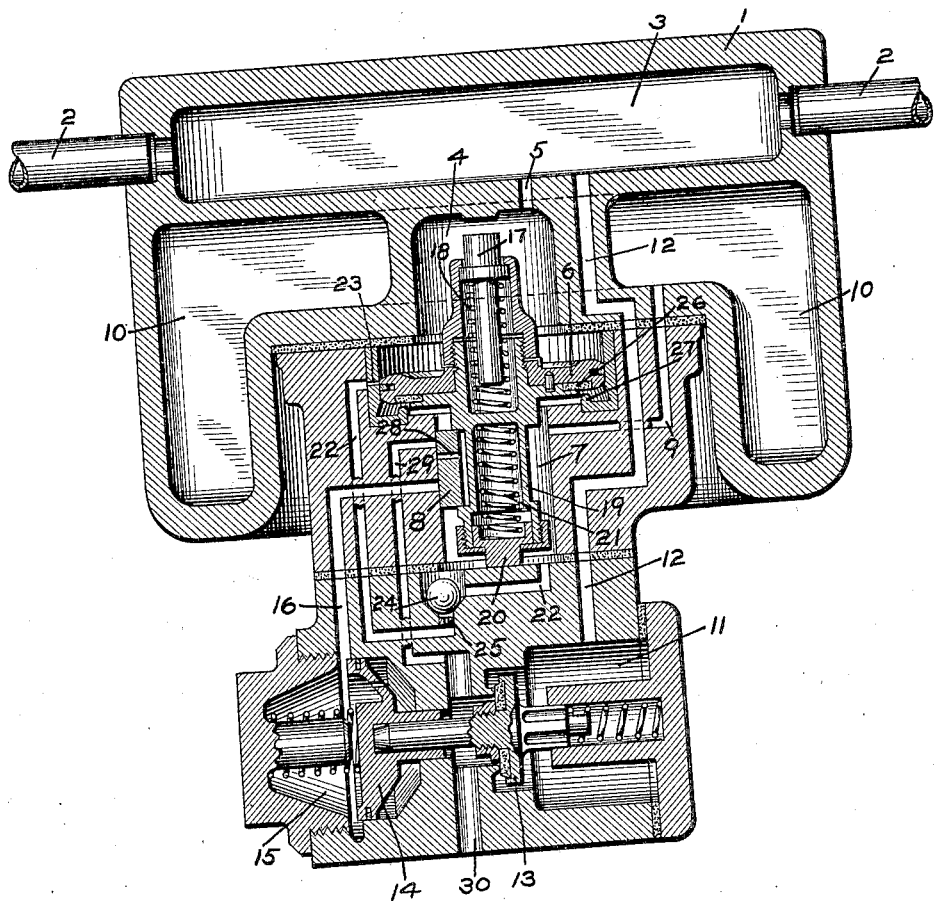
INVENTOR
THOMAS H. THOMAS
BY Wm. H. Cady
ATTORNEY

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-PIPE VENT-VALVE.

1,384,930.

Specification of Letters Patent.

Patented July 19, 1921.

Application filed August 21, 1920. Serial No. 405,014.

*To all whom it may concern:*

Be it known that I, THOMAS H. THOMAS, a citizen of the United States, residing at Edgewood, in the county of Allegheny and State of Pennsylvania, have invented new and useful Improvements in Brake-Pipe Vent-Valves, of which the following is a specification.

This invention relates to fluid pressure brakes, and more particularly to a brake pipe vent valve device.

It has heretofore been proposed to provide a brake pipe vent valve device having a piston subject to the opposing pressures of the brake pipe and a quick action chamber which is adapted to be charged with fluid under pressure from the brake pipe and valve means operated by said piston upon a reduction in brake pipe pressure at an emergency rate for effecting the operation of a brake pipe vent valve.

In releasing the brakes, the brake valve is first moved to release position, in which fluid is supplied to the brake pipe at a pressure higher than the standard brake pipe pressure, so as to secure a prompt and rapid increase in brake pipe pressure throughout the train and then the brake valve is moved to running position in which the pressure of fluid supplied to the brake pipe is limited to the standard brake pipe pressure and the overcharge in brake pipe pressure at the head end of the train settles down to the standard pressure or even less.

If the quick action chamber were allowed to become overcharged from the brake pipe, then when the brake valve is moved from release to running position, the fall of the brake pipe pressure may be at a sufficient rate to cause the movement of the emergency piston to emergency position, thus causing an emergency venting of fluid from the brake pipe when not desired or intended.

The overcharging of the quick action chamber has been heretofore prevented by restricting the communication through which the quick action chamber is charged from the brake pipe, so that the quick action chamber will not have time to become overcharged during the interval in which the brake pipe pressure is settling down to the standard pressure.

It has been found, however, that in some cases leakage past the piston rings of the emergency piston in addition to the flow of fluid through the recharging passage may be sufficient to effect the overcharging of the quick action chamber.

The principal object of my invention is to provide a brake pipe vent valve device having means for overcoming the above difficulty.

In the accompanying drawing, the single figure is a sectional view of a brake pipe vent valve device embodying my invention.

As shown in the drawing, the brake pipe vent valve device may comprise a casing 1, interposed in the brake pipe 2, so that the chamber 3 therein forms a conduit for the flow of fluid under pressure through the brake pipe.

A piston chamber 4 in the casing, connected by passage 5 to the brake pipe chamber 3, contains an emergency piston 6 and the opposite side of the piston is subject to the pressure of a valve chamber 7, containing a slide valve 8, adapted to be operated by piston 6, and connected by a passage 9 to a quick action chamber 10.

The casing 1 also has a valve chamber 11, connected by passage 12 to the brake pipe chamber 3 and containing a brake pipe vent valve 13 adapted to be operated by a piston 14 contained in piston chamber 15, said chamber having a passage 16, leading to the seat of emergency slide valve 8.

Mounted in the piston 6 is a stop 17, acted upon by a light spring 18, for yieldingly defining the service positions of the piston 6 and slide valve 8, and mounted in the piston stem 19 is a stop 20, acted upon by a spring 21.

In the release position of the piston 6, as shown in the drawing, a quick action chamber charging passage 22 is opened, said passage having a restricted port 23, leading to piston chamber 4 and containing a ball check valve 24, for preventing back flow from valve chamber 7 to the piston chamber 4, a choke plug 25, having a restricted port, being interposed in said passage, below the check valve 24.

In order to prevent leakage of fluid under pressure past the piston 6 to the valve chamber 7, when the brake pipe is overcharged in releasing the brakes, the piston 6 is provided with a seal 26 adapted to engage a seat ring 27.

In operation, the piston chamber 4 is charged from the brake pipe through passage 5, and fluid under pressure flows through passage 22, past check valve 24, charging the valve chamber 7, and the quick action chamber 10, through passage 9.

Upon a gradual service rate of reduction in brake pipe pressure, the piston 6 moves out until the stop 17 engages the casing, and in this position, a port 28 registers with a passage 29. Fluid under pressure is then vented from valve chamber 7 and quick action chamber 10, to the atmospheric exhaust port 30 of the quick action valve 13, at a rate sufficient to prevent the further movement of the piston to emergency position.

Upon a sudden emergency rate of reduction in brake pipe pressure, the piston 6 is moved out to emergency position, compressing the spring 18, and the slide valve 8 is moved so that passage 16 is connected to valve chamber 7. Fluid under pressure is then supplied to piston chamber 15 and the piston 14 is operated to open the vent valve 13 and vent fluid from the brake pipe through passage 12 to the exhaust port 30, so that a local reduction in brake pipe pressure is effected.

Upon increasing the brake pipe pressure to effect the release of the brakes, the piston 6 will be shifted to its extreme inner position, in which the seat 26 engages the seating ring 27, so that possible leakage from piston chamber 4, past the piston, to the valve chamber 7 is prevented and consequently the quick action chamber 10 cannot be overcharged.

When the pressure in the brake pipe settles back to the standard pressure, the spring 21 will act to move the piston 6 slightly away from the seat ring 27, so that the full area of the piston 6 will be subject to the pressure in valve chamber 7 and the desired sensitiveness of the piston 6 to movement will be retained.

Having now described my invention, what I claim as new and desire to secure by Letters Patent, is:—

1. In a fluid pressure brake, the combination with a brake pipe, a piston subject to the opposing pressures of the brake pipe and a chamber adapted to be charged from the brake pipe, and means operated by said piston for venting fluid from the brake pipe, of means operated upon increasing the brake pipe pressure to effect the release of the brakes, for preventing leakage of fluid from the brake pipe past the piston to said chamber.

2. In a fluid pressure brake, the combination with a brake pipe, a piston subject to the opposing pressures of the brake pipe and a chamber adapted to be charged from the brake pipe, and means operated by said piston for venting fluid from the brake pipe, of a seat on said piston and a seating ring adapted to be engaged by said seat upon movement of said piston by an increase in brake pipe pressure to thereby prevent leakage from the brake pipe past the piston to said chamber.

3. In a fluid pressure brake, the combination with a brake pipe, a valve device for venting fluid from the brake pipe, a piston subject to the opposing pressures of the brake pipe and a chamber having a passage for charging the chamber from the brake pipe, and a valve operated by said piston for varying the fluid pressure on said valve device, of means for making a tight seal at the piston upon movement of the piston under an increase in brake pipe pressure, to thereby prevent leakage of fluid from the brake pipe around the piston to said chamber.

4. In a fluid pressure brake, the combination with a brake pipe, a piston subject to the opposing pressures of the brake pipe and a chamber adapted to be charged from the brake pipe, and means operated by said piston for venting fluid from the brake pipe, of means for making a fluid tight seal at the piston to prevent leakage of fluid around the piston from the brake pipe to said chamber upon increasing the brake pipe pressure and a yielding stop for moving said piston away from its seal upon substantial equalization of fluid pressures on opposite sides of the piston.

In testimony whereof I have hereunto set my hand.

THOMAS H. THOMAS.